United States Patent
Park et al.

Patent Number: 6,083,858
Date of Patent: Jul. 4, 2000

[54] SEALING GLASS COMPOSITION

[75] Inventors: Tae Ho Park; Sung Hoon Moon; Young Gil Nam, all of Seoul, Rep. of Korea

[73] Assignee: Samsung Corning Co., Ltd., Kyungki-do, Rep. of Korea

[21] Appl. No.: 09/263,487

[22] Filed: Mar. 8, 1999

Related U.S. Application Data

[63] Continuation-in-part of application No. 08/949,859, Oct. 14, 1997, abandoned.

[30] Foreign Application Priority Data

Oct. 11, 1996 [KR] Rep. of Korea ............... 96-45360

[51] Int. Cl.$^7$ ............... C03C 3/066; C03C 3/074; C03C 8/04; C03C 8/06; C03C 8/10; C03C 8/14

[52] U.S. Cl. ............... 501/15; 501/17; 501/22; 501/25; 501/26; 501/32; 501/43; 501/49; 501/76; 501/79

[58] Field of Search ............... 501/15, 17, 22, 501/25, 27, 32, 43, 49, 76, 79

[56] References Cited

U.S. PATENT DOCUMENTS

| | | |
|---|---|---|
| 4,097,296 | 6/1978 | Thomas, III et al. |
| 5,612,261 | 3/1997 | Lim et al. ............... 501/32 |
| 5,691,254 | 11/1997 | Sakamoto et al. ............... 501/17 |

*Primary Examiner*—C. Melissa Koslow
*Assistant Examiner*—David Sample
*Attorney, Agent, or Firm*—Pillsbury Madison & Sutro LLP

[57] ABSTRACT

The present invention relates to a sealing glass composition, which is able to seal a panel and funnel of a color TV at low temperature for a short time by adding Garnet ($Fe_3Al_2Si_3O_{12}$) as a nucleating agent and filler component to control the thermal expansion coefficient.

3 Claims, 1 Drawing Sheet

SEALING GLASS COMPOSITION

This is a Continuation-in-Part of National Appln. No. 08/949,859 filed Oct. 14, 1997 now abandoned.

BACKGROUND OF THE INVENTION

1. Technical Field

The present invention relates to a sealing glass composition, in particular, one which is able to seal a panel and funnel of color TV at low temperature for a short time by adding Garnet($Fe_3Al_2Si_3O_{12}$) as a nucleating agent and filler component to control thermal expansion coefficient.

2. Description of Related Prior Art

As disclosed in U.S. Pat. No. 2,889,952, a crystalline sealing glass composition used for sealing panel and funnel of color TV is a PbO—ZnO—$B_2O_3$-based glass, having a sealing temperature of 440° C. and a sealing time of about 1 hour. However, such a high sealing temperature and long sealing time decreases the productivity of manufacturing a color TV Braun tube.

Accordingly, in order to increase its productivity in manufacturing CRT for color TV, development and utilization of a sealing glass composition capable of lowering sealing temperature and reducing sealing time has been required.

Until now the development thereof has been carried out is two ways, that is, one is lowering sealing temperature and the other is reducing sealing time.

First, to develop sealing glass compositions which have a low melting point, glass softening temperature, and which are able to reduce sealing temperature are disclosed in U.S. Pat. Nos. 4,097,296 and 4,246,034 with PbO—ZnO—$B_2O_3$-based glass containing fluorine.

Generally, PbO—ZnO—$B_2O_3$-based glass compositions containing fluorine have to be used with low expansion filler because its thermal expansion coefficient is too high and its mechanical strength is low. Generally, a mixture of mother glass and one or more compounds selected from natural zircon($ZrSiO_4$), lead titanate ($PbTiO_3$), cordierite, willemite, β-eucryptite and β-spodumene are used as filler.

The content of the filler is different from the composition of mother glass powder. U.S. Pat. No. 4,097,296 discloses a glass composition with 2~6 wt % of natural zircon. And U.S. Pat. No. 4,246,034 discloses a glass composition with 4~10 wt % of cordierite.

Sealing temperature of the glass composition is lowered by 20° C. compared with the conventional composition, although the sealing keeping time(45minutes to 1 hour) of the glass composition is longer by 15~30 minutes than conventional products.

In order to improve the productivity of a color TV Braun tube, reducing sealing time is more important than lowering sealing temperature. Accordingly, a sealing glass composition with a low sealing temperature didn't lead to improved productivity in manufacturing color TV Braun tube.

Decreased flowability by adding large amounts of filler into the glass composition adversely affects sealing.

Addition of alkaline oxidant, to the glass composition is desirable in that sealing temperature is lowered and flowability is good, but such additions cause a problem with sealing of the panel and funnel of a color TV requiring high insulation because alkaline ion in glass has high electric mobility.

The second direction taken in the development of a sealing glass composition is reducing sealing time.

U.S. Pat. No. 3,947,279 discloses composition which contains precrystallized PbO—ZnO—$B_2O_3$-based glass as a seed and is able to seal a panel and funnel for 28 minutes at a sealing temperature of 445° C. U.S. Pat. No. 4,589,899 discloses composition which contains zinc zirconium silicate as a nucleating agent and is able to seal for 15~25 minutes at 440° C.

However, as above noted, use of a nucleating agent reduces crystallization time, but the flowability necessary to effective seal, may be lost because excess crystallization occurs before a flow is sufficiently conducted and glass mechanical strength is decreased due to excess growth of crystal.

Because it has the same sealing temperature or higher than that of the prior art, it has a limitation to improve the productivity of color TV Braun tube.

From the viewpoint of reducing sealing time, sealing is possible even when crystallization is not sufficient. However, cracking on sealing glass may a rise during a vaccum exhaust process around at 350~380° C. after sealing a panel and funnel of glass, because thermal expansion coefficient changes rapidly around at glass transition temperature due to excess of non-crystallized part. Although cracking of sealing glass would not be a problem, mechanical strength of sealing glass would be decreased.

If the sealing glass compositions content of natural zircon is increased to reduce sealing time, flowability cannot be ensured by preventing wetting, and the flowability of sealing glass required for sufficient sealing may not occur, because zircon's role as filler is superior to that as nucleating agent and its thermal expansion coefficient is extremly decreased.

SUMMARY OF THE INVENTION

The object of this invention is to provide a new sealing glass composition which is able to lower sealing temperature, reduce sealing time and prevent the premature crystallization and the decrease of flowability by adding a large amount of Garnet($Fe_3Al_2Si_3O_{12}$) as filler and nucleating agent into crystalline sealing glass composition with low m.p.

DETAILED DESCRIPTION OF THE INVENTION

Figure 1:
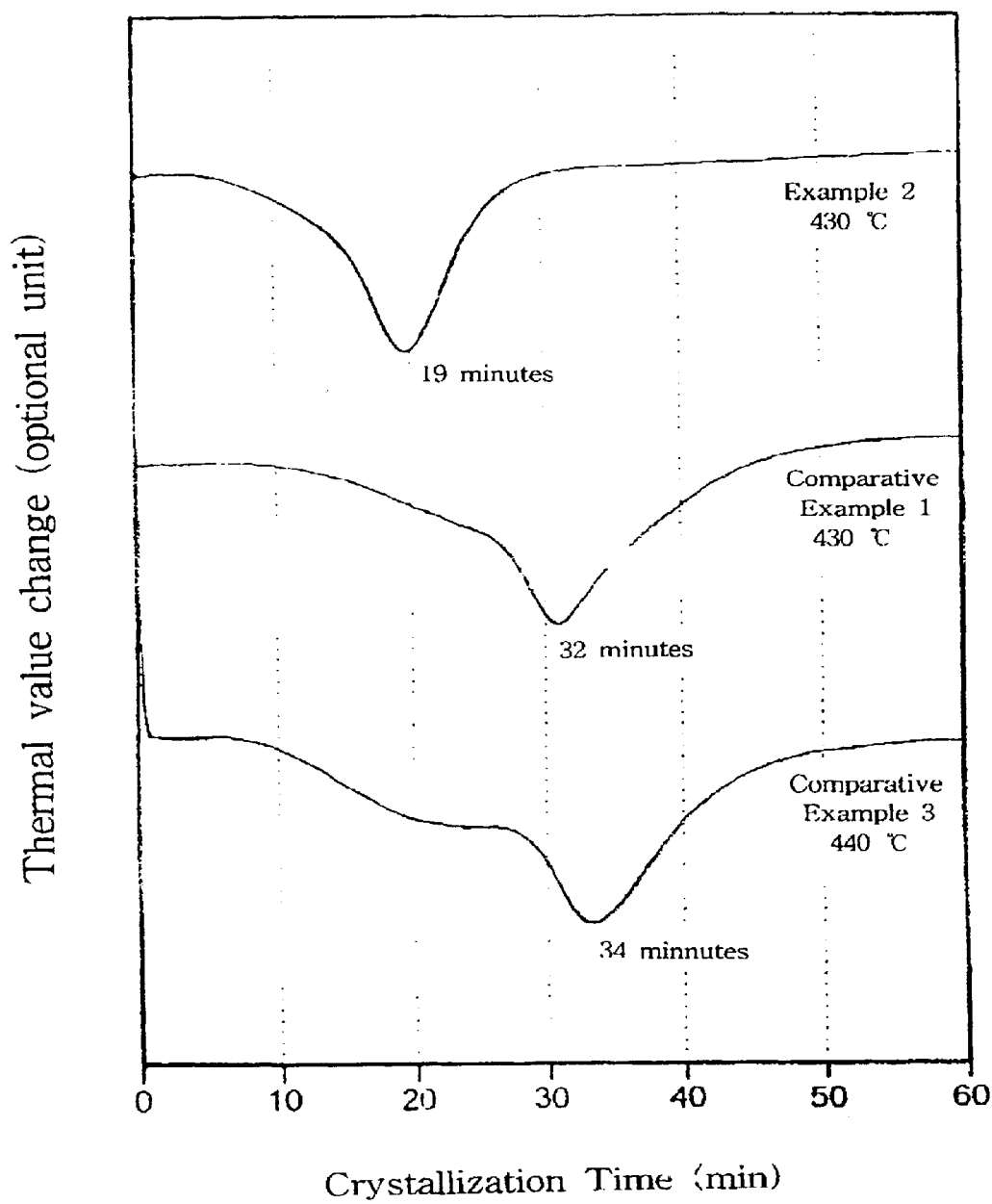
FIG. 1 is a isothermal DSC curve of sealing glass composition which is prepared in the Example 2, Comparative Example 1, and Comparative Example 3.

The sealing glass composition according to the present invention comprises PbO—ZnO—$B_2O_3$-based glass powder and Garnet($Fe_3Al_2Si_3O_{12}$) instead of natual zircon as nucleating agent and filler component.

The present invention uses PbO—ZnO—$B_2O_3$-based crystalline glass powder contains fluorine, and thus to lower sealing temperature from 440° C., conventional temperature, to 430° C.

Considering composition of PbO—ZnO—$B_2O_3$-based crystalline glass powder, which comprises 74~82 wt % of PbO, 7~10 wt % of $B_2O_3$, 8~12 wt % of ZnO, 1~4 wt % of $SiO_2$, 0.05~0.5 wt % of MgO, 0.1~0.5 wt % of BaO and 0.1~0.5 wt % of F.

If the content of PbO is less than 74 wt %, it is undesirable in that the transition temperature of glass is high and the sealing temperature of panel and funnel glass of TV is so increased, while if more than 82 wt %, it is undesiable in that the transparency is lost while the glass is melting.

If the content of $B_2O_3$ is less than 7 wt %, it is undesirable because the transparency of glass is lost during the glass-melting process, while if more than 10 wt %, it is undesirable because the transition temperature of glass is too high.

If the content of ZnO is less than 8 wt %, it is undesirable because the degree of crystallization is decreased, while if more than 12 wt %, it is undesirable because the transparency is lost during the glass melting process.

And, if the content of $SiO_2$ is less than 1 wt %, it is undesirable because the strength of glass is decreased, while if more than 4 wt %, it is also undesirable because the melting point of glass is too high.

In case of MgO, MgO can make the crystallization retarded and the thermal expansion mismatch reduced. However, the effect of MgO depends on the ratio of F existing in glass and it is very important to maintain the balance between F and MgO. If the content of MgO is less than 0.05 wt %, the flowability of glass is lost because the crystallization cannot be retarded, while if more than 0.5 wt %, a glass cannot be crystallized due to excess repressing of crystallization.

BaO is added in order to improve a sealing strength and to satisfy the thermal expansion requiring, but it dosen't have a great effect on the flowability of glass. If the content of BaO is less than 0.1 wt %, it has no effect on its adding, while if more than 0.5 wt %, glass softening temperature is too high.

Fluorine is added to improve the flowability required for in sealing at low temperature. If the content of fluorine is less than 0.1 wt %, it has no flowability increasing effect, while if more than 0.5 wt %, it has an influence on its thermal expansion behavior and its mechanical strength is decreased.

However, as noted in the above, the mother glass has a characteristic of high thermal expansion coefficient because network-structure has a loose structure relatively by substituting network forming ion with fluorine in mother glass. Such a large thermal expansion coefficient and low strength may cause a crack or disorder while sealing the panel and funnel glass of a color TV.

Also in the state of mother glass of 430° C., because the crystallization time is about 30 minutes, Crystallization time needs to be within 20 minutes to ensure the high productivity and to reduce the sealing time, At this point, the flowability of sealing glass cannot be ensured because the crystallization of glass occurs rapidly before the flowability needed for sealing is ensured. Accordingly in order to solve the said problems in the present invention, 0.1~5.0 wt % of Garnet($Fe_3Al_2Si_3O_{12}$) is added as nucleating agent to reduce crystallization time and as filler to decrease the thermal expansion coefficient and to intensify the strength. If the content of Garnet ($Fe_3Al_2Si_3O_{12}$) is less than 0.1 wt %, crystallization time and thermal expansion coefficient cannot be reduced, while if more than 5.0 wt %, the flowability of sealing glass cannot be ensured because crystallization occurs rapidly before flowability needed for sealing is ensured.

The Garnet($Fe_3Al_2Si_3O_{12}$) characterized in this invention is used as a nucleating agent and filler at the same time for the following reasons;

The specific surface area of Garnet($Fe_3Al_2Si_3O_{12}$) used in this invention is 0.82 $m^2/g$, whereas that of natural zircon used in the prior art is 0.72 $m^2/g$. Therfore garnet ($Fe_3Al_2Si_3O_{12}$) can make an effetive crystallization on account of providing a lot of nuclear-forming place between mother glass and nucleating agent.

Cordierite, willemite and $Al_2O_3$ used as filler in the present invention have the thermal expansion coefficient of 25~65×$10^7$/° C., garnet($Fe_3Al_2Si_3O_{12}$) has 85×$10^7$/° C. and mother glass has 99×$10^7$/° C.

Because the difference of thermal expansion coefficient between Garnet($Fe_3Al_2Si_3O_{12}$) and mother glass is relatively little, thermal stress doesn't come out on the interface between mother glass and filler. Accordingly, that makes thermal expansion coefficient reduced effectively and the low strength; of mother glass reinforced.

As described in the above, the glass composition according to this invention adding specific content of Garnet ($Fe_3Al_2Si_3O_{12}$) as nucleating agent and as filler has the same or better physical property compared with that of prior product, that is, its sealing temperature is lowered from 440° C. to 430° C., and its sealing-keeping time is reduced from 30~40 minutes to 20 minutes. Accordingly, that makes the productivity of the sealing panel and funnel of color TV tube improve.

This present invention will be illustrated as more detailed following examples, but it is not limited by the examples.

EXAMPLE 1~3, COMPARATIVE EXAMPLE 1~4

As shown in the following Table 1, crystalline glass powder compositions comprising PbO, $B_2O_3$, ZnO, $SiO_2$, MgO, BaO and F are prepared. The said components were melted in a platinum crucible at 1,200° C. for 2 hours, and formed to ribbon cullet, and then the ribbon cullet was grinded by ball-mill into the crystalline glass powder and Garnet($Fe_3Al_2Si_3O_{12}$) in powder-form under 400 meshes was prepared.

The said glass powder and Garnet($Fe_3Al_2Si_3O_{12}$) were respectively weighed under the ratio on Table 1 and mixed to obtain crystalline sealing glass compositions.

Example 1~3 shows sealing glass composition adding specific content of Garnet ($Fe_3Al_2Si_3O_{12}$) in new composition of mother glass.

Comparative Example 1 shows new composition of mother glass only.

Comparative Example 2 shows composition adding zircon which has been used on the conventional products.

The thermal expansion coefficient was measured by TMA (Thermo Mechanical Analyzer), at 30~250° C.

The bending strength was measured by following method; each sample was press-moulded by rectangular mould(40× 10×10 mm), heat-treated under each heat-treatment condition; it was polished by sand paper(#1000) to prepare sample of 40×10×5 mm size; and then the bending strength for the sample was measured by UTM(Universal Testing Machine) using 3-point bending strength method.

TABLE 1

| Classification | | Composition of glass powder (wt %) | | | | | | | Sealing glass composition (wt %) | | |
|---|---|---|---|---|---|---|---|---|---|---|---|
| | | PbO | ZnO | $B_2O_3$ | $SiO_2$ | BaO | MgO | F | glass powder | Garnet | Zircon |
| Example | 1 | 77 | 11 | 9 | 2.1 | 0.3 | 0.2 | 0.4 | 99.9 | 0.1 | — |
| | 2 | 77 | 11 | 9 | 2.1 | 0.3 | 0.2 | 0.4 | 98.5 | 1.5 | — |
| | 3 | 77 | 11 | 9 | 2.1 | 0.3 | 0.2 | 0.4 | 95.0 | 5.0 | — |
| Comparative | 1 | 77 | 11 | 9 | 2.1 | 0.3 | 0.2 | 0.4 | 100.0 | — | — |
| | 2 | 77 | 11 | 9 | 2.1 | 0.3 | 0.2 | 0.4 | 99.25 | — | 0.75 |
| Example | 3 | 75 | 12 | 9 | 2 | 2 | — | — | 100.0 | — | — |
| | 4 | 75 | 12 | 9 | 2 | 2 | — | — | 99.25 | — | 0.75 |

TABLE 2

| Classification | | Transition temperature of glass (° C.) | Bending strength (kg/cm$^2$) | F/B size (mm) | Thermal expansion coefficient (× $10^7$/° C.) | Crystallization time (min) | Sealing temperature (° C.) |
|---|---|---|---|---|---|---|---|
| Example | 1 | 308 | 420 | 27.6 | 97.0 | 20 | 430 |
| | 2 | 308 | 470 | 27.2 | 964 | 19 | 430 |
| | 3 | 308 | 485 | 26.8 | 95.7 | 17 | 430 |
| Comparative | 1 | 308 | 415 | 28.5 | 99.4 | 32 | 430 |
| | 2 | 308 | 434 | 24.7 | 93.7 | 10 | 430 |
| Example | 3 | 320 | 445 | 27.5 | 98.1 | 30~40 | 440 |
| | 4 | 320 | 450 | 27.0 | 97.4 | 30~40 | 440 |

Comparative Example 3 and 4 show the conventional products.

The flowability, the transition temperature, the bending strength, and the thermal expansion coefficient and the crystallization time of the said crystalline glass compositions were measured. The results are shown in the following Table 2.

In these tests, the flowability was measured by the following method; 10 g of the sealing glass composition was press-modeled in a cylinderic metallic mould(diameter; 18 mm), laid on a soda-lime glass plate and heat-treated under heat-treatment condition of each sample, and then outer-diameter of them was measured.

The transition temperature and the crystallization temperature of glass were measured by DSC(Differential Scanning Calorimetry).

As shown in FIG. 1, compared with conventional products, the sealing in this invention made it possible to lower sealing temperature and to reduce sealing time in this invention.

According to the results shown in the Table 2 and FIG. 1, the composition(Comparative Example) solely composed of the new mother glass had no effect on reducing sealing time and the mechanical strength is lower than that of the prior product and its thermal expansion coefficient is also high.

The new composition adding zircon which has been used in the conventional products can't be sealed because the flowability is rapidly decreases due to excess growth of crystal.

In sealing glass composition according to the present invention which contains a specific content of Garnet ($Fe_3Al_2Si_3O_{12}$) in the new composition of mother glass, physical properties such as the thermal expansion coefficient, the flowability and the bending strength are improved or similar, and the sealing temperature is lowered and sealing time is reduced(Example 1~3).

Thus, the sealing glass composition according to the present invention is very effective to improve the productivity of CRT manufacturing for a color TV Braun tube.

What is claimed is:

1. A sealing glass composition comprising:
   95 to 99.9 wt % of PbO—ZnO—$B_2O_3$-based crystalline glass powder comprising 0.05 wt % to 0.5 wt % MgO and 0.1 to 0.5 wt % F in a MgO:F ratio of 5:1 to 1.5:1; and 0.1 to 5 wt % of Garnet having the formula $Fe_3Al_2Si_3O_{12}$.

2. The sealing glass composition according to claim 1, wherein the said PbO—ZnO—$B_2O_3$-based crystalline glass powder comprises 74~82 wt % of PbO, 7~10 wt % of $B_2O_3$, 8~12 wt % of ZnO, 1~4 wt % of $SiO_2$, and 0.1~0.5 wt % of BaO.

3. The sealing glass composition according to claim 1, wherein said sealing glass composition is characterized in that a sealing temperature is 430° C. and a sealing time is in 20 minutes.

* * * * *